(12) United States Patent
Shou et al.

(10) Patent No.: US 6,323,977 B2
(45) Date of Patent: Nov. 27, 2001

(54) OPTICAL TRANSMITTING AND RECEIVING APPARATUS

(75) Inventors: Toshiaki Shou; Fumio Sato, both of Sagamihara; Yoshiaki Yunoki, Tokyo; Motoyasu Nagashima, Kashiwa; Masamichi Sato, Tokyo; Kazumasa Taninaka, Ichikawa, all of (JP)

(73) Assignees: Victor Company of Japan, Ltd.; NTT Data Communications Systems Corporation, both of (JP)

( * ) Notice: Subject to any disclaimer, the term of this patent is extended or adjusted under 35 U.S.C. 154(b) by 0 days.

(21) Appl. No.: 09/732,897

(22) Filed: Dec. 11, 2000

Related U.S. Application Data

(62) Division of application No. 09/037,860, filed on Mar. 10, 1998, now Pat. No. 6,181,452.

(30) Foreign Application Priority Data

Mar. 28, 1997 (JP) .................................................. 9-78506

(51) Int. Cl.[7] .................................................. H04B 10/00
(52) U.S. Cl. .......................... 359/152; 359/153; 359/159; 359/172
(58) Field of Search .................................. 359/152, 153, 359/159, 172

(56) References Cited

U.S. PATENT DOCUMENTS

| | | | |
|---|---|---|---|
| 3,894,228 | * | 7/1975 | Cobb, Jr. ........................... 240/46.31 |
| 4,588,895 | * | 5/1986 | Kurbitz ................................ 250/551 |
| 4,717,913 | * | 1/1988 | Elger ................................ 340/825.54 |
| 5,530,578 | * | 6/1996 | Takemoto et al. ................... 359/152 |
| 5,532,858 | * | 7/1996 | Hirohashi et al. ................... 359/159 |
| 5,646,761 | * | 7/1997 | Medved et al. ..................... 359/172 |
| 5,648,862 | * | 7/1997 | Owen .................................. 359/153 |
| 6,038,404 | * | 3/2000 | Suzuki et al. .......................... 396/79 |
| 6,043,916 | * | 3/2000 | Poisel et al. ......................... 359/156 |
| 6,181,452 | * | 1/2001 | Shou et al. ........................... 359/159 |

FOREIGN PATENT DOCUMENTS 8-139675  5/1996 (JP) .

\* cited by examiner

Primary Examiner—Leslie Pascal
Assistant Examiner—Hanh Phan
(74) Attorney, Agent, or Firm—Parkhurst & Wendel, L.L.P.

(57) ABSTRACT

In an optical transmitting and receiving apparatus. an light transmitting and receiving unit includes a light emitting element, a light transmitting lens, a light receiving lens, and a photosensitive element. The light emitting element outputs light. The light outputted from the light emitting element passes through the light transmitting lens before leaving the light transmitting and receiving unit as outgoing light. The light receiving lens concentrates incoming light on the photosensitive element. A first support member is operative for supporting the light transmitting and receiving unit, and for allowing the light transmitting and receiving unit to rotate about a first axis. A first rotary mechanism connected to the light transmitting and receiving unit and the first support member is operative for rotating the light transmitting and receiving unit about the first axis. A second support member is operative for supporting the light transmitting and receiving unit on a cantilever basis, and for allowing the light transmitting and receiving unit to rotate about a second axis perpendicular to the first axis. A second rotary mechanism connected to the light transmitting and receiving unit and the second support member is operative for rotating the light transmitting and receiving unit about the second axis.

6 Claims, 15 Drawing Sheets

OPTICAL TRANSMITTING AND RECEIVING APPARATUS

This is a Division of application Ser. No. 09/037,860 filed Mar. 10, 1998 now U.S. Pat No. 6,181,452.

BACKGROUND OF THE INVENTION

1. Field of the Invention

This invention relates to an apparatus for transmitting and receiving optical signals which can be used in, for example, a wireless communication network.

2. Description the Related Art

In a wired LAN (local area network), terminal devices are connected to each other via wires. The terminal devices can communicate with each other via the wires.

It is known to combine a wired LAN and a wireless communication network. For example, a wired LAN is additionally provided with an access point device (a gateway device) which can execute both wired communication and wireless communication. The access point device is connected via wires to normal terminal devices in the wired LAN. The access point device can communicate with the normal terminal devices in the wired LAN via the wires. Also, the access point device can execute wireless communication with terminal devices in a wireless communication network. In this case, the wired LAN and the wireless communication network are connected via the access point device (the gateway device). In addition, the access point device is a member of the wired LAN as well as a member of the wireless communication network.

According to an example of the wireless communication network, the access point device (the gateway device) and the terminal devices can communicate with each other by using optical signals such as infrared-light signals.

Japanese patent laid open number (Japanese published unexamined patent application) 8-139675 discloses an optical transmitting and receiving apparatus which is used in an optical communication network. The apparatus in Japanese patent laid open number 8-139675 includes a light transmitting and receiving unit which has a light transmitting mirror and a light receiving mirror coaxial with each other. The light transmitting and receiving unit can be rotated about a vertical axis and also about a horizontal axis. The rotation of the light transmitting and receiving unit enables its optical axis to be accorded with an optical axis of a communication opposite party.

Japanese patent laid open number 8-139675 also discloses a light transmitting and receiving unit which has a light transmitting mirror and a light receiving mirror arranged side by side along a vertical direction.

SUMMARY OF THE INVENTION

It is a first object of this invention to provide an optical transmitting and receiving apparatus which is lighter in weight than a prior-art apparatus.

It is a second object of this invention to provide an optical transmitting and receiving apparatus which is smaller in size than a prior-art apparatus.

It is a third object of this invention to provide an optical transmitting and receiving apparatus whose optical axis can be varied at a speed higher than the speed of variation of an optical axis of a prior-art apparatus.

A first aspect of this invention provides an optical transmitting and receiving apparatus comprising a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, and wherein the light receiving lens concentrates incoming light on the photosensitive element: a first support member for supporting the light transmitting and receiving unit, and for allowing the light transmitting and receiving unit to rotate about a first axis; a first rotary mechanism connected to the light transmitting and receiving unit and the first support member for rotating the light transmitting and receiving unit about the first axis; a second support member for supporting the light transmitting and receiving unit on a cantilever basis, and for allowing the light transmitting and receiving unit to rotate about a second axis perpendicular to the first axis; and a second rotary mechanism connected to the light transmitting and receiving unit and the second support member for rotating the light transmitting and receiving unit about the second axis.

A second aspect of this invention provides an optical transmitting and receiving apparatus comprising a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, and wherein the light receiving lens concentrates incoming light on the photosensitive element; a first shaft connected to the light transmitting and receiving unit for rotation together therewith; a first support member for supporting the first shaft, and for allowing the first shaft to rotate; a first rotary mechanism connected to the first shaft and the first support member for rotating the first shaft relative to the first support member; a second shaft being perpendicular to the first shaft and being connected to a base of the first support member for rotation together with the first support member; a second support member for supporting the first support member via the second shaft, and for allowing the first support member to rotate; and a second rotary mechanism connected to the second shaft and the second support member for rotating the second shaft relative to the second support member.

A third aspect of this invention is based on the first aspect thereof, and provides an optical transmitting and receiving apparatus wherein the second axis is substantially horizontal.

A fourth aspect of this invention is based on the first aspect thereof, and provides an optical transmitting and receiving apparatus wherein each of the first and second rotary mechanisms includes a worm, a wheel gear in mesh with the worm, and a pressing mechanism for pressing the worm against the wheel gear.

A fifth aspect of this invention is based on the first aspect thereof, and provides an optical transmitting and receiving apparatus further comprising first and second arms provided on the first support member and opposing each other; a transmission-side flexible cable extending along the first arm and reaching the light emitting element; and a reception-side flexible cable leading from the photosensitive element and extending along the second arm.

A sixth aspect of this invention is based on the second aspect thereof, and provides an optical transmitting and receiving apparatus further comprising a first bearing supporting the first shaft and being composed of electrically-conductive members, and a second bearing supporting the second shaft and being composed of electrically-conductive members.

A seventh aspect of this invention provides an optical transmitting and receiving apparatus comprising a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, wherein the light receiving lens concentrates incoming light on the photosensitive element, and wherein the light transmitting lens and the light receiving lens are arranged side by side and face in equal directions; and a rotary mechanism for rotating the light transmitting and receiving unit about an axis; wherein a distance between the axis and a top of the light transmitting lens is smaller than a distance between the axis and a top of the light receiving lens.

An eighth aspect of this invention provides an optical transmitting and receiving apparatus comprising a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, wherein the light receiving lens concentrates incoming light on the photosensitive element, and wherein the light transmitting lens and the light receiving lens are arranged side by side and face in equal directions; a first rotary mechanism for rotating the light transmitting and receiving unit about a first axis; a second rotary mechanism for rotating the light transmitting and receiving unit about a second axis perpendicular to the first axis; wherein a center of the light receiving lens is on the second axis, and the light transmitting lens is smaller in diameter than the light receiving lens, and wherein a center of the light transmitting lens is offset from the second axis by a predetermined distance to provide a space at a side of the light transmitting lens, the space accommodating the first rotary mechanism.

A ninth aspect of this invention provides an optical transmitting and receiving apparatus comprising a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, wherein the light receiving lens concentrates incoming light on the photosensitive element, and wherein the light transmitting lens and the light receiving lens are arranged side by side and face in equal directions; a rotary mechanism for rotating the light transmitting and receiving unit; a dome-shaped cover covering the light transmitting and receiving unit, and conducting light of a predetermined wavelength while blocking light of a wavelength different from the predetermined wavelength; and a cylindrical visor connected to the light transmitting lens and having an end close to an inner surface of the cover.

A tenth aspect of this invention is based on the ninth aspect thereof, and provides an optical transmitting and receiving apparatus wherein the end of the visor and the inner surface of the cover are substantially equal in radius of curvature.

An eleventh aspect of this invention is based on the ninth aspect thereof, and provides an optical transmitting and receiving apparatus further comprising a cylindrical visor connected to the light receiving lens, wherein the visor connected to the light transmitting lens is integral with the visor connected to the light receiving lens.

DESCRIPTION OF THE PREFERRED EMBODIMENT

Figure 1:
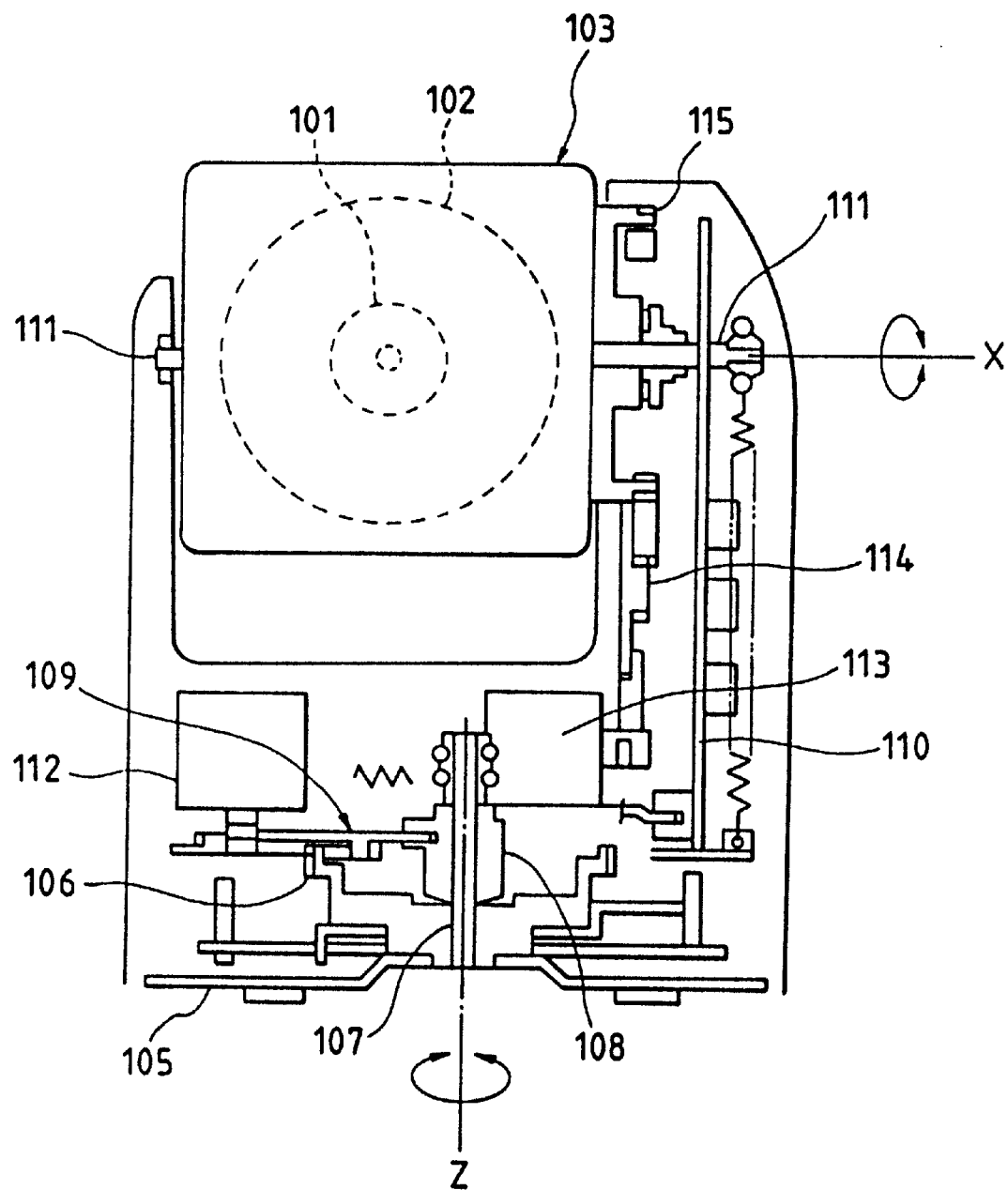
FIG. 1 is a sectional diagram of a prior-art optical transmitting and receiving apparatus.

A prior-art apparatus will be explained for a better understanding of this invention. FIG. 1 shows a prior-art optical transmitting and receiving apparatus disclosed in Japanese patent laid open number 8-139675.

With reference to FIG. 1, the prior-art apparatus includes a light transmitting mirror 101 and a light receiving mirror 102 which are coaxially provided in a light transmitting and receiving unit 103. The light transmitting and receiving unit 103 can be moved to provide reliable bi-directional optical communication with an apparatus of a communication opposite party.

The prior-art apparatus of FIG. 1 includes a base 105. A fixed gear 106 is mounted on a vertical shaft 107 rotatably supported on a central area of the base 105. A bearing block 108 rotatably extending around the vertical shaft 107 is supported on the fixed gear 106. A rotary base 109 is attached to the bearing block 108. A frame 110 is attached to the rotary base 109. Accordingly, the frame 110 rotates together with the rotary base 109. Horizontal shafts 111 are rotatably supported by upper portions of the frame 110. The light transmitting and receiving unit 103 is supported by the horizontal shafts 111.

In the prior-art apparatus of FIG. 1, a motor 112 is mounted on the rotary base 109. A gear mounted on an output shaft of the motor 112 meshes with the fixed gear 106. As the output shaft of the motor 112 rotates, the rotary base 109 is turned relative to the fixed gear 106. Accordingly, the motor 112 serves to turn the rotary base 109 about the axis of the vertical shaft 107. A motor 113 is mounted on the rotary base 109. A speed-reducing gear set 114 connects the output shaft of the motor 113 and a gear 115 provided on the light transmitting and receiving unit 103. The gear 115 extends around one of the horizontal shafts 111. As the output shaft of the motor 113 rotates, the gear 115 rotates about the axis of the related horizontal shaft 111. The light transmitting and receiving unit 103 rotates together with the gear 115.

In the prior-art apparatus of FIG. 1, the light transmitting and receiving unit 103 can be rotated by the motor 113 about a horizontal axis "X". Also, the light transmitting and receiving unit 103 can be rotated by the motor 112 about a vertical axis "Z". The rotation of the light transmitting and receiving unit 103 enables its optical axis to be accorded with an optical axis of a communication opposite party. The optical-axis accordance enables reliable bi-directional optical communication between the prior-art apparatus and the communication opposite party.

Figure 2:
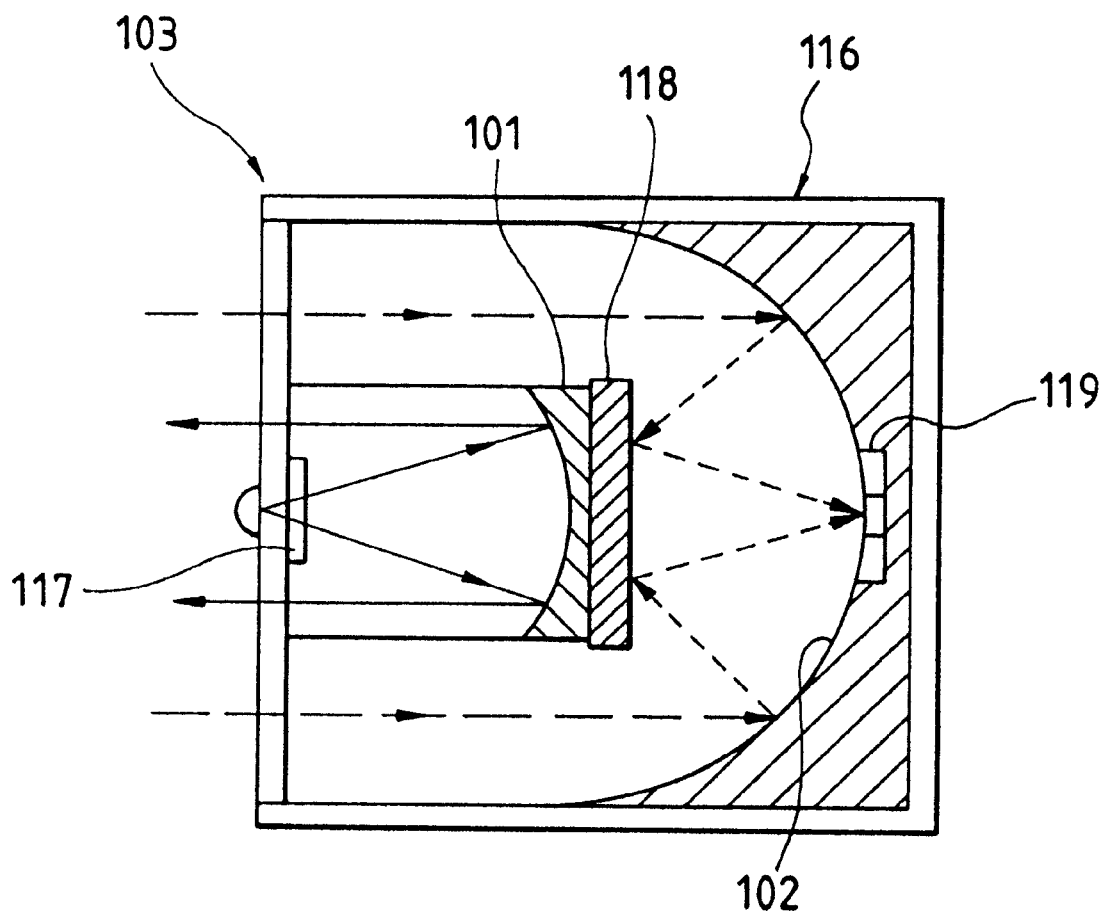
FIG. 2 is a sectional view of a light transmitting and receiving unit in the prior-art apparatus of FIG. 1.

As shown in FIG. 2, the light transmitting and receiving unit 103 in the prior-art apparatus includes a box casing 116 which accommodates the light transmitting mirror 101 and the light receiving mirror 102. The light transmitting mirror 101 includes a small parabolic reflecting mirror. The light receiving mirror 102 includes a large parabolic reflecting mirror. The light transmitting mirror 101 and the light receiving mirror 102 are coaxial with each other. The light transmitting and receiving unit 103 includes a light emitting element 117. Light is outputted from the light emitting element 117 toward the light transmitting mirror 101. The light reaches the light transmitting mirror 101, being reflected thereby before travelling forward from the light transmitting and receiving unit 103 as an outgoing parallel light beam. The light transmitting and receiving unit 103 also includes a reflecting mirror 118 and a photosensitive element 119. Incoming light enters the light transmitting and receiving unit 103 and then meets the light receiving mirror 102. The incoming light is successively reflected by the light receiving mirror 102 and the reflecting mirror 118 before reaching the photosensitive element 119. The light receiving mirror 102 serves to concentrate the incoming light on the photosensitive element 119.

In the prior-art apparatus of FIG. 1, the light transmitting mirror 101 and the light receiving mirror 102 tend to be heavy in weight. Accordingly, the speed of movement of the light transmitting and receiving unit 103 is limited to a relatively low speed. The light receiving mirror 102 tends to be large in size.

Figure 3:
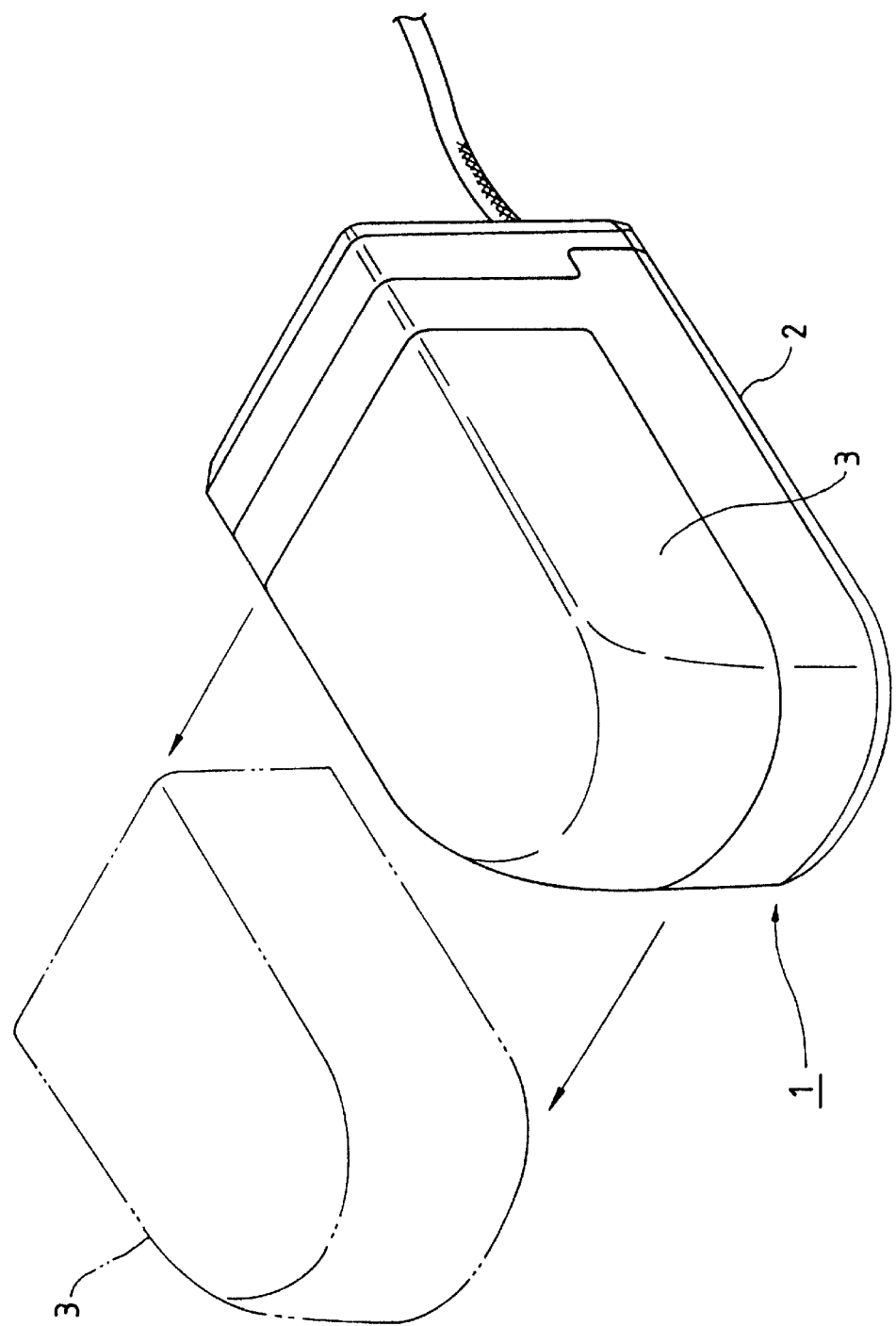
FIG. 3 is a perspective view of an optical transmitting and receiving apparatus according to an embodiment of this invention.

An embodiment of this invention will be explained hereinafter. FIG. 3 shows an optical transmitting and receiving apparatus 1 according to an embodiment of this invention.

With reference to FIG. 3, the optical transmitting and receiving apparatus 1 includes a casing 2 made of resin. The casing 2 has a base and a cover 3. The cover 3 is detachably connected to the base of the casing 2. Preferably, the cover 3 has a dome shape. The cover 3 is made of resin. The cover 3 is transparent with respect to near infrared light but is opaque with respect to visible light. According to another example, the cover 3 absorbs visible light, and is transparent with respect to near infrared light having a wavelength of 700 nm or longer.

The optical transmitting and receiving apparatus 1 has a shape approximately corresponding to a rectangular parallelepiped with one curved side. The base of the casing 2 has a sufficient area. The height of the apparatus 1 is relatively small. Accordingly, the apparatus 1 is effectively prevented from rolling. This is advantageous in maintaining a high reliability of light transmission and light reception by the apparatus 1.

Figure 4:
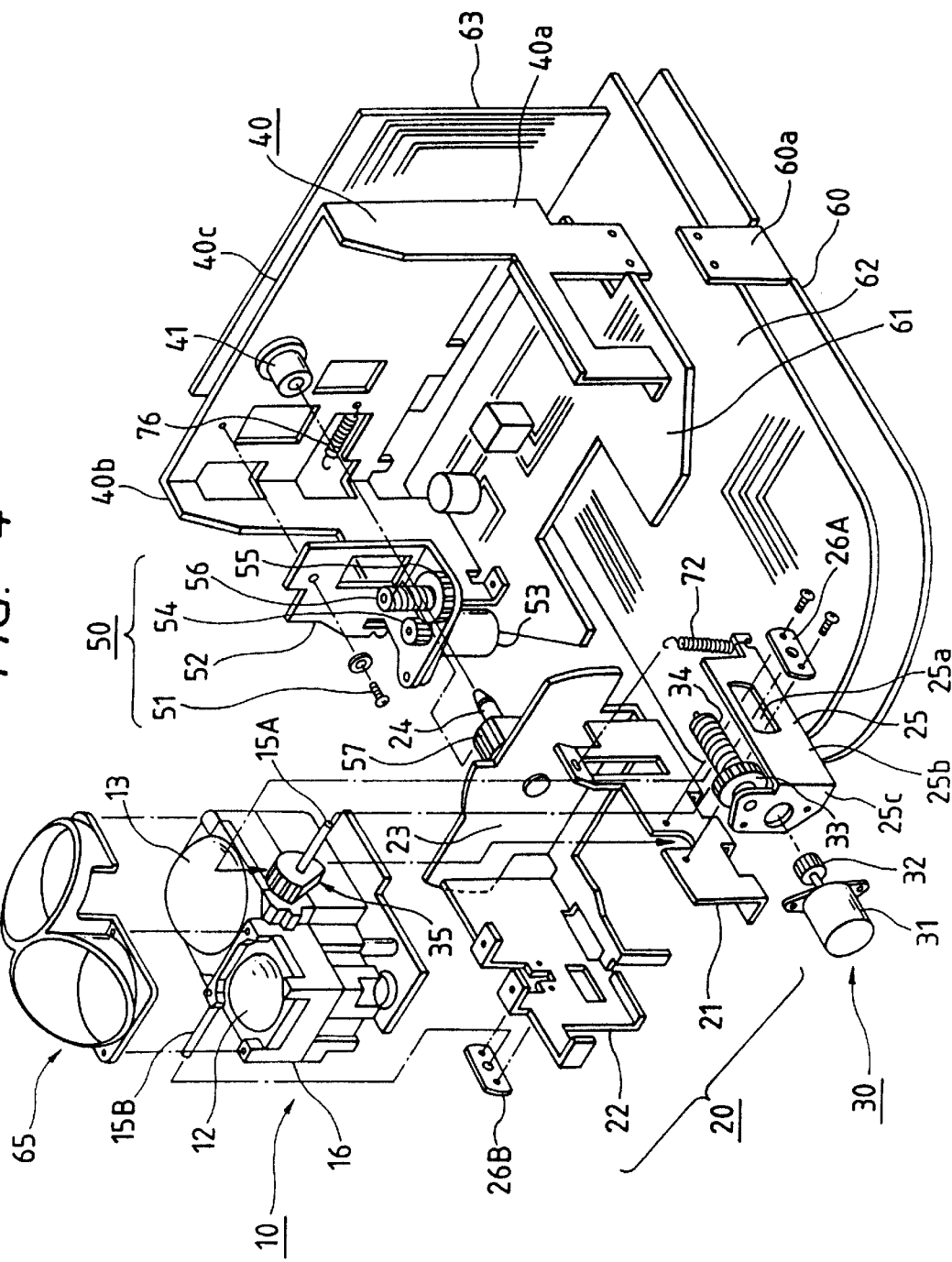
FIG. 4 is a perspective exploded view of the optical transmitting and receiving apparatus in FIG. 3.

As shown in FIG. 4, the optical transmitting and receiving apparatus 1 includes a light transmitting and receiving unit 10, a first support member 20, a first rotary mechanism 30, a second support member 40, and a second rotary mechanism 50. The casing 2 which includes the cover 3 (see FIG. 3) houses these devices 10, 20, 30, 40, and 50.

Figure 10:
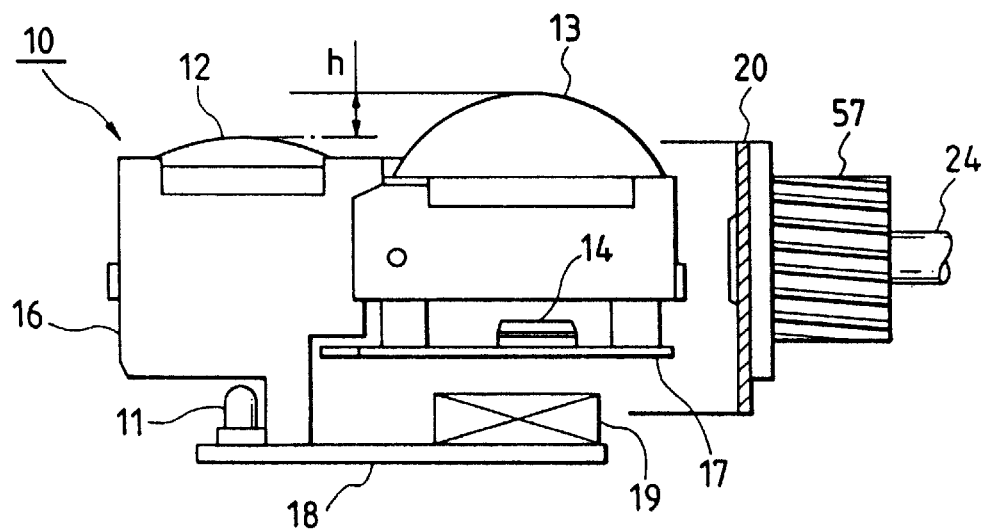
FIG. 10 is a sectional view taken along the line A10–A10 in FIG. 5.

The light transmitting and receiving unit 10 includes a light emitting element 11 (see FIG. 10), a light transmitting lens 12, a light receiving lens 13, and a photosensitive element 14 (see FIG. 10). The light emitting element 11 is designed to output near infrared light which can efficiently pass through the cover 3. The photosensitive element 14 is designed to sense near infrared light which can efficiently pass through the cover 3. Light outputted from the light emitting element 11 (see FIG. 10) passes through the light transmitting lens 12, and then travels forward from the light transmitting and receiving unit 10 as outgoing light. Incoming light which enters the light transmitting and receiving unit 10 passes through the light receiving lens 13. The incoming light is concentrated by the light receiving lens 13 on the photosensitive element 14 (see FIG. 10).

The first support member 20 has a forked shape. The first support member 20 has a pair of left-hand and right-hand arms 21 and 22 extending parallel to each other. The light transmitting and receiving unit 10 is supported by a pair of left-hand and right-hand shafts 15A and 15B which are rotatably borne by the arms 21 and 22 of the first support member 20 respectively. The shafts 15A and 15B axially align with each other. The shafts 15A and 15B are fixed to a body of the light transmitting and receiving unit 10. As will be made clear later, the left-hand shaft 15A is a driven shaft. The light transmitting and receiving unit 10 rotates in accordance with rotation of the left-hand shaft 15A.

The first rotary mechanism 30 is connected to the first support member 20. The first rotary mechanism 30 serves to rotate the left-hand shaft 15A. Thus, the first rotary mechanism 30 serves to rotate the light transmitting and receiving unit 10 about the axes of the shafts 15A and 15B.

The second support member 40 is connected to a shaft 24 extending perpendicular to the shafts 15A and 15B. The shaft 24 is provided on a base portion of the first support member 20. The shaft 24 is secured to the first support member 20. Accordingly, the first support member 20 rotates together with the shaft 24. The second support member 40 bears the first support member 20 via the shaft 24 on a cantilever basis. The first support member 20 can be rotated relative to the second support member 40 about the axis of the shaft 24.

It is preferable that the axis of the shaft 24 is exactly or substantially (approximately) in a horizontal plane. The axis of the shaft 24 may be inclined with respect to the horizontal plane by a predetermined angle.

The second rotary mechanism 50 is connected to the second support member 40. The second rotary mechanism 50 couples with the shaft 24. The second rotary mechanism 50 serves to rotate the shaft 24 and the first support member 20 relative to the second support member 40. Thus, the second rotary mechanism 50 serves to rotate the light transmitting and receiving unit 10 about the axis of the shaft 24.

The light receiving lens 13 is greater in diameter than the light transmitting lens 12. Both the light transmitting lens 12 and the light receiving lens 13 include aspherical lenses. The focal lengths of such aspherical lenses can be significantly shorter than those of spherical lenses. Accordingly, the light transmitting lens 12 and the light receiving lens 13 enable a small height of the light transmitting and receiving unit 10. The light transmitting lens 12 and the light receiving lens 13 are surrounded by a visor 65 which will be explained later.

The first support member 20 is a frame having the left-hand and right-hand arms 21 and 22, a back plate 23, and the shaft 24. The first support member (the frame) 20 has a forked shape in a plan view. The left-hand and right-hand arms 21 and 22 are parallel to each other. The back plate 23 is perpendicular to the left-hand and right-hand arms 21 and 22. The left-hand and right-hand arms 21 and 22 extend from a front surface of the back plate 23. The left-hand and right-hand arms 21 and 22 are supported by the back plate 23. The shaft 24 projects from a rear surface of the back plate 23 in a direction opposite to the directions along which the left-hand and right-hand arms 21 and 22 extend from the front surface of the back plate 23. The shaft 24 serves as a shaft on a base portion of the first support member 20.

An approximately L-shaped side plate 25 extends along the left-hand arm 21. The side plate 25 is rotatably supported on the left-hand arm 21. The side plate 25 has a first portion 25b and a second portion 25c which are connected to each other and which are perpendicular to each other. The portion 25b of the side plate 25 is parallel to the left-hand arm 21. The portion 25b of the side plate 25 has a rectangular window 25a. A bearing 26A having a sleeve portion is attached to the left-hand arm 21 by screws. During the attachment of the bearing 26A to the left-hand arm 21, the screws are accessed via the rectangular window 25a. The left-hand shaft 15A is rotatably supported by the bearing 26A Similarly, a bearing 26B having a sleeve portion is attached to the right-hand arm 22 by screws. The right-hand shaft 15B is rotatably supported by the bearing 26B.

The first support member 20 is made of an electrically-conductive metal plate. The first support member 20 is formed by press molding. The bearings 26A and 26B are composed of electrically-conductive members.

The first rotary mechanism 30 includes a motor 31, a small-diameter gear 32, a large-diameter gear 33, a worm 34, and a wheel gear 35. A body of the motor 31 is attached to the portion 25c of the side plate 25. The small-diameter gear 32 is fixedly mounted on an output shaft of the motor 31. The large-diameter gear 33 meshes with the small-diameter gear 32. The worm 34 is fixed to the large-diameter gear 33. The worm 34 and the large-diameter gear 33 are rotatably supported on the side plate 25. The wheel gear 35 meshes with the worm 34. The wheel gear 35 is fixedly mounted on the left-hand shaft 15A. The wheel gear 35 has a circular shape from which an arcuate portion is omitted. Accordingly, the teeth of the wheel gear 35 extend along only a part of a circumference. As will be explained later, a flexible cable is passed through a region formed by the omission of the arcuate portion from the wheel gear 35. This design enables the apparatus 1 to be compact.

The second support member 40 is a fixed frame having a pair of left-hand and right-hand side walls 40a and 40b, and a back wall 40c. The left-hand and right-hand side walls 40a and 40b are connected by the back wall 40c. The left-hand and right-hand side walls 40a and 40b are perpendicular to the back wall 40c. The second support member (the frame) 40 has a U shape in a plan view, and has an L shape in a side view. The second support member (the frame) 40 is made of a metal plate, and is formed by press molding. The second support member (the frame) 40 is sufficiently rigid. A bearing 41 for receiving the shaft 24 is provided on a central area of the back wall 40c. The bearing 41 is composed of electrically-conductive members. The second rotary mechanism 50 is provided on the second support member (the frame) 40. The second rotary mechanism 50 extends near the bearing 41.

The bearings 26A, 26B, and 41 are composed of electrically conductive members. Accordingly, the body of the optical transmitting and receiving unit 10, the first support member 20, and the second support member 40 are electrically connected via the bearings 26A, 26B, and 41. This design prevents static electricity from building up in the apparatus 1.

The second rotary mechanism 50 includes a swing plate 52, a motor 53, a small-diameter gear 54, a large-diameter gear 55, a worm 56, and a wheel gear 57. The swing plate 52 is connected to the back wall 40c of the second support member 40 by a pin 51. A body of the motor 53 is attached to the swing plate 52. The small-diameter gear 54 is fixedly mounted on an output shaft of the motor 53. The large-diameter gear 55 meshes with the small-diameter gear 54. The worm 56 is fixed to the large-diameter gear 55. The worm 56 and the large-diameter gear 55 are rotatably supported on the swing plate 52. The wheel gear 57 meshes with the worm 56. The wheel gear 57 is fixedly mounted on the shaft 24. The wheel gear 57 has a circular shape from which an arcuate portion is omitted. Accordingly, the teeth of the wheel gear 57 extend along only a part of a circumference. A flexible cable (not shown) can be placed in a region formed by the omission of the arcuate portion from the wheel gear 57.

A bottom bracket 60 has upward projections 60a which hold the second support member 40. A first printed circuit board 61 is attached to the second support member 40. A second printed circuit board 62 is supported on the bottom bracket 60. A third printed circuit board 63 is supported on the bottom bracket 60 or the second support member 40. The third printed circuit board 63 may be mounted on the second printed circuit board 62. The first printed circuit board 61 extends horizontally. Also, the second printed circuit board 62 extends horizontally. The first and second printed circuit boards 61 and 62 are parallel to each other. This arrangement provides a small height of the apparatus 1. The third printed circuit board 63 is perpendicular to the first and second printed circuit boards 61 and 62.

Figure 5:
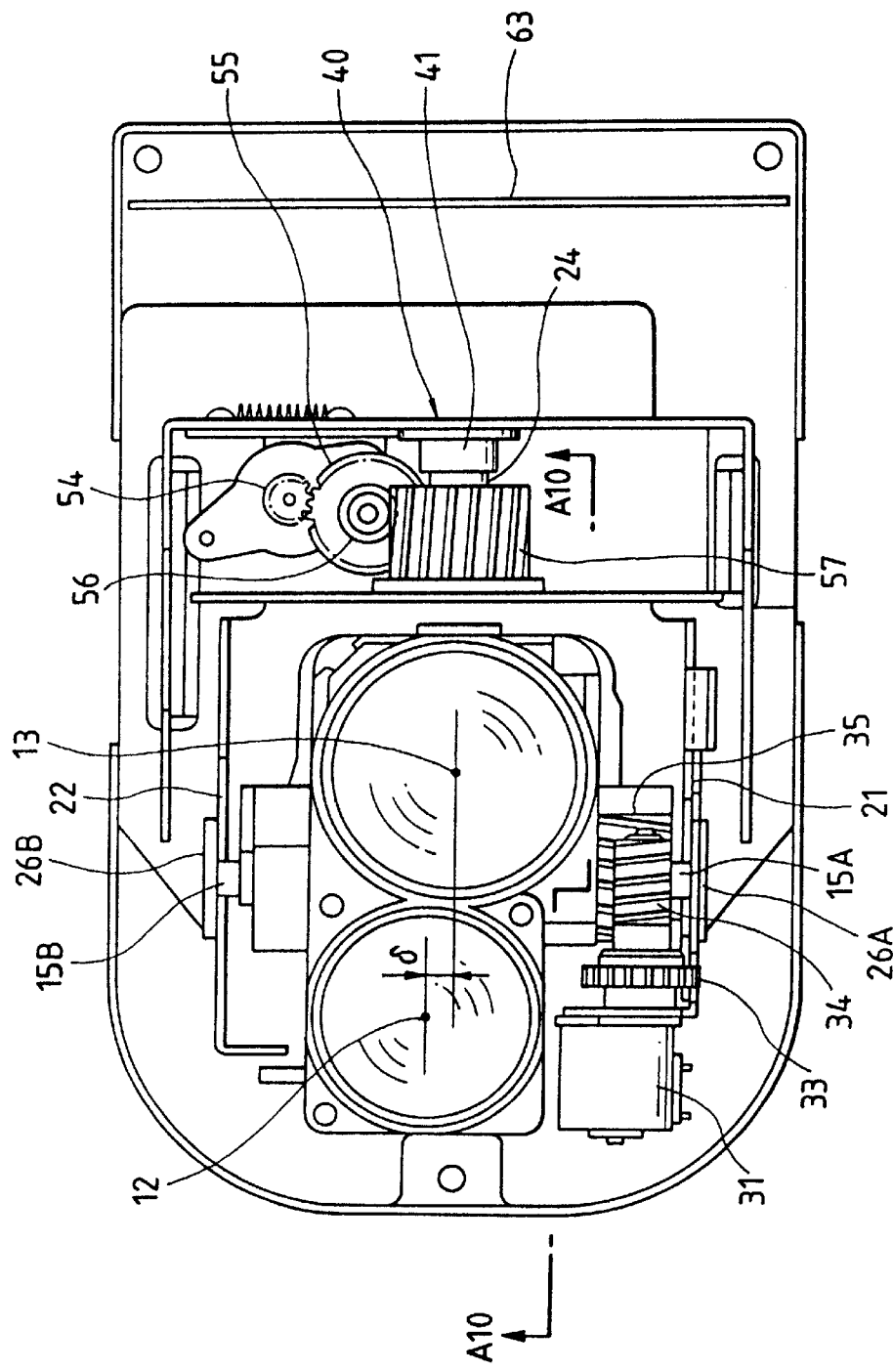
FIG. 5 is a top view of the optical transmitting and receiving apparatus in FIG. 3 from which a cover is removed.

As shown in FIG. 5, the longitudinal line (the lengthwise line) passing through the center of the light transmitting lens 12 is offset from the longitudinal line (the lengthwise line) passing through the center of the light receiving lens 13 by a predetermined distance "δ" in a direction away from the motor 31. The longitudinal line passing through the center of the light receiving lens 13 coincides with the axis of the shaft 24 as viewed from above. The left-hand shaft 15A is connected via the bearing 26A to the left-hand arm 21 of the first support member 20. The right-hand shaft 15B is connected via the bearing 26B to the right-hand arm 22 of the first support member 20. The shaft 24 is connected via the bearing 41 to the second support member 40.

Figure 6:
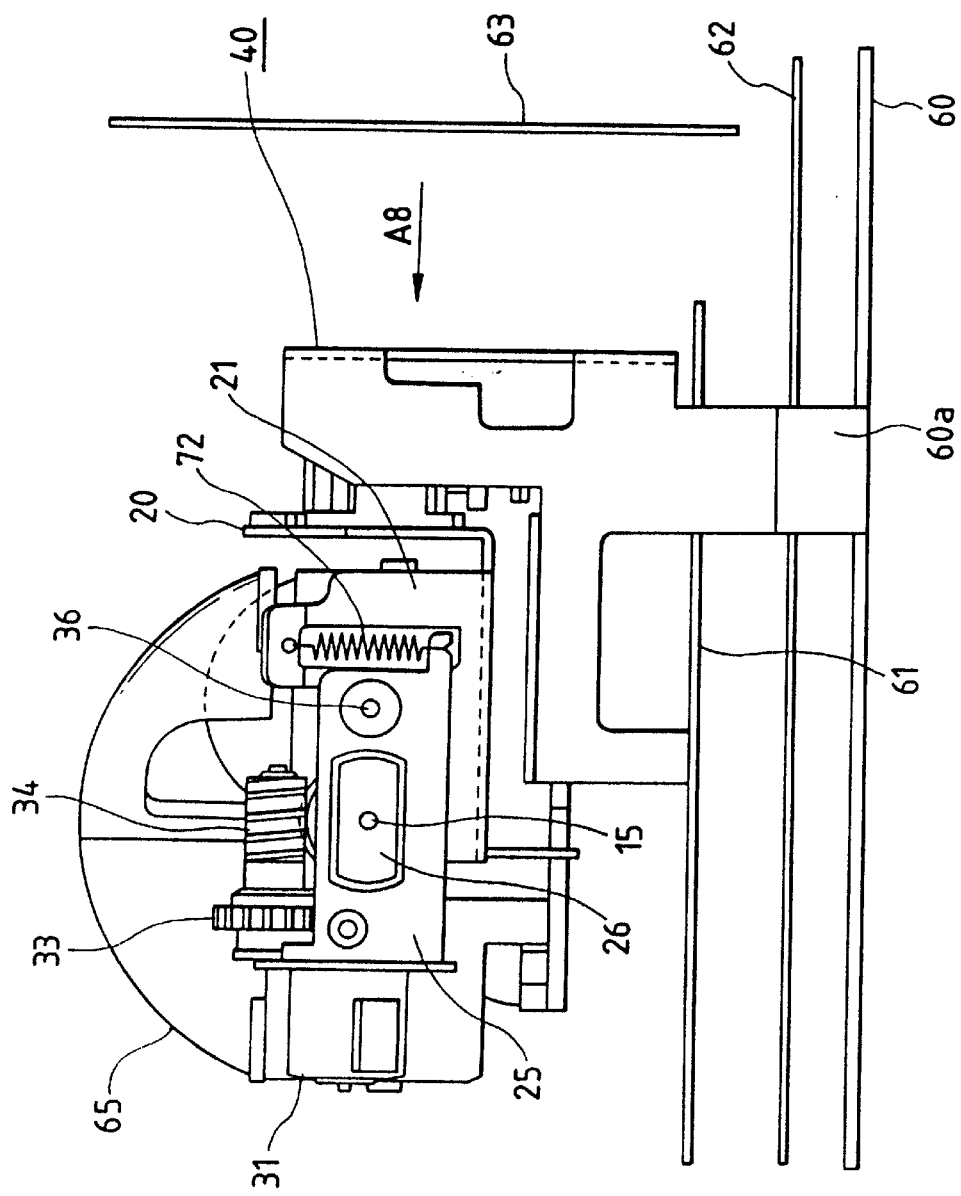
FIG. 6 is a side view of a portion of the optical transmitting and receiving apparatus in FIG. 5.

As shown in FIG. 6, the first printed circuit board 61 extends above the second printed circuit board 62. The second printed circuit board 62 extends above the bottom bracket 60. The first and second printed circuit boards 61 and 62, and the bottom bracket 60 are parallel to each other. The third printed circuit board 63 is perpendicular to the first and second printed circuit boards 61 and 62. The second support member 40 is attached to the bottom bracket 60 via the upward projections 60a. The first support member 20 is connected to the second support member 40 on a cantilever basis. The side plate 25 is rotatably connected to the left-hand arm 21 via a pin 36. The side plate 25 supports the motor 31, the small-diameter gear 32 (not shown in FIG. 6), the large-diameter gear 33, and the worm 34 which are the parts of the first rotary mechanism 30.

Figure 7:
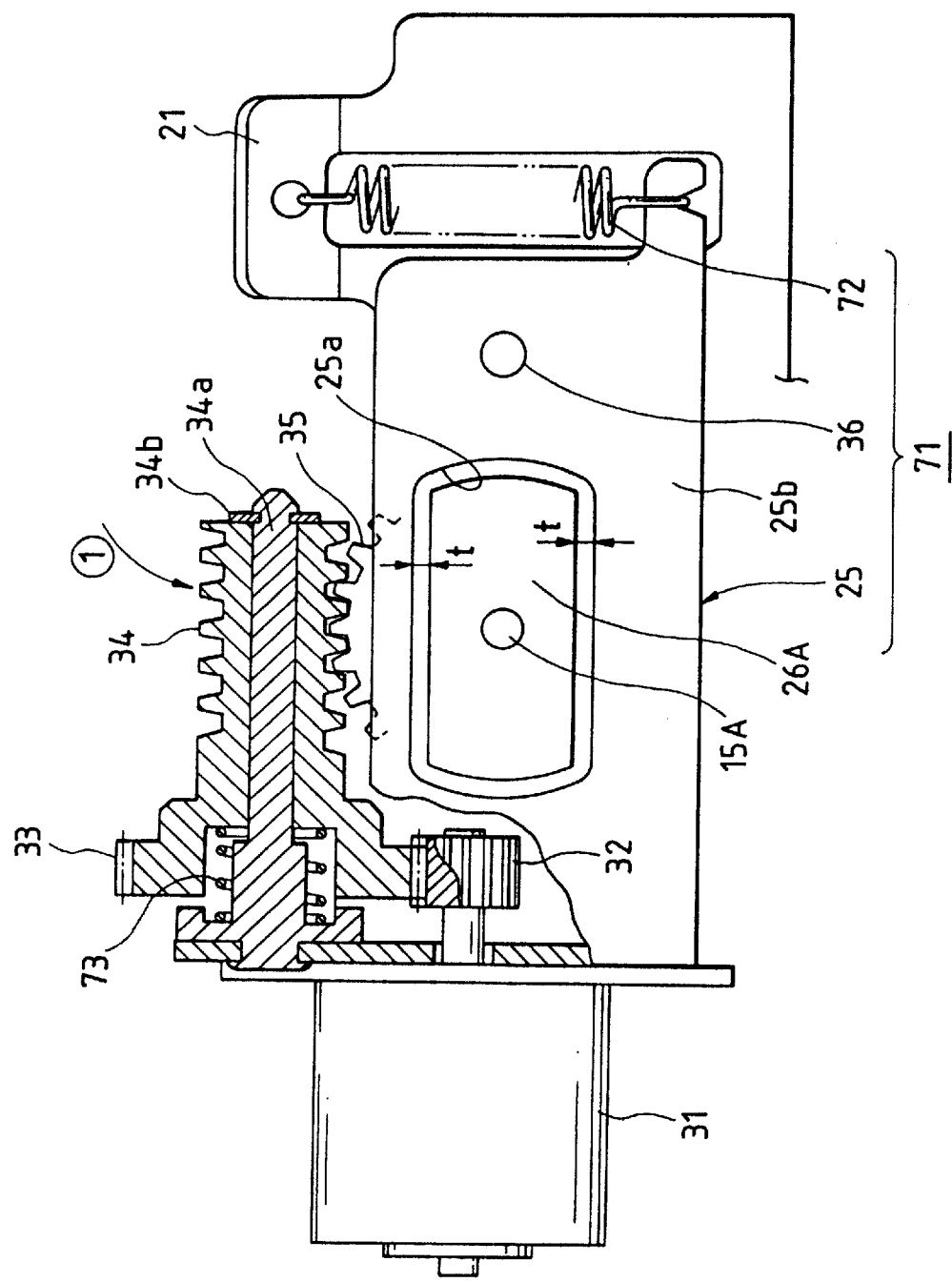
FIG. 7 is a side view, partially in section, of a first pressing mechanism in the optical transmitting and receiving apparatus in FIG. 6.

With reference to FIG. 7, a pressing mechanism 71 urges the worm 34 into mesh with the wheel gear 35. The pressing mechanism 71 includes the side plate 25, the left-hand arm 21, and a spring 72. The side plate 25 can rotate relative to the left-hand arm 21 about the pin 36. The spring 72 is connected between the left-hand arm 21 and the portion 25b of the side plate 25. The spring 72 urges the side plate 25 relative to the left-hand arm 21 in a counterclockwise direction. The bearing 26A is accommodated in the rectangular window 25a in the side plate 25. The bearing 26A is similar in shape to the rectangular window 25a. The rectangular window 25a has dimensions such that when the bearing 26A is centered at the rectangular window 25a, the edges of the walls of the side plate 25 which define the rectangular window 25a are spaced from the bearing 26A by a predetermined uniform gap "t". Accordingly, the side plate 25 can move from its central position In upward and downward directions by a distance corresponding to the predetermined gap "t".

As previously-indicated, the wheel gear 35 is fixedly mounted on the left-hand shaft 15A. The worm 34 is supported on the side plate 25. The spring 72 urges the side plate 25 in the counterclockwise direction, thereby pressing the worm 34 against the wheel gear 35 along an oblique direction ①. Thus, the worm 34 is pressed against the wheel gear 35 in both an axial direction and a radial direction, and a backlash hardly occurs between the worm 34 and the wheel gear 35. The worm 34 is slidably mounted on a shaft 34a fixed to the side plate 25. A compression spring 73 urges the worm 34 axially relative to the shaft 34a. Accordingly, a backlash hardly occurs between the worm 34 and the wheel gear 35 even when the direction of rotation of the worm 34 changes. Thus, it is possible to provide a good response of rotational control of the left-hand shaft 15A and a good reliability of the apparatus 1. The worm 34 can be stopped by a snap ring 34b mounted on the shaft 34a.

Figure 8:
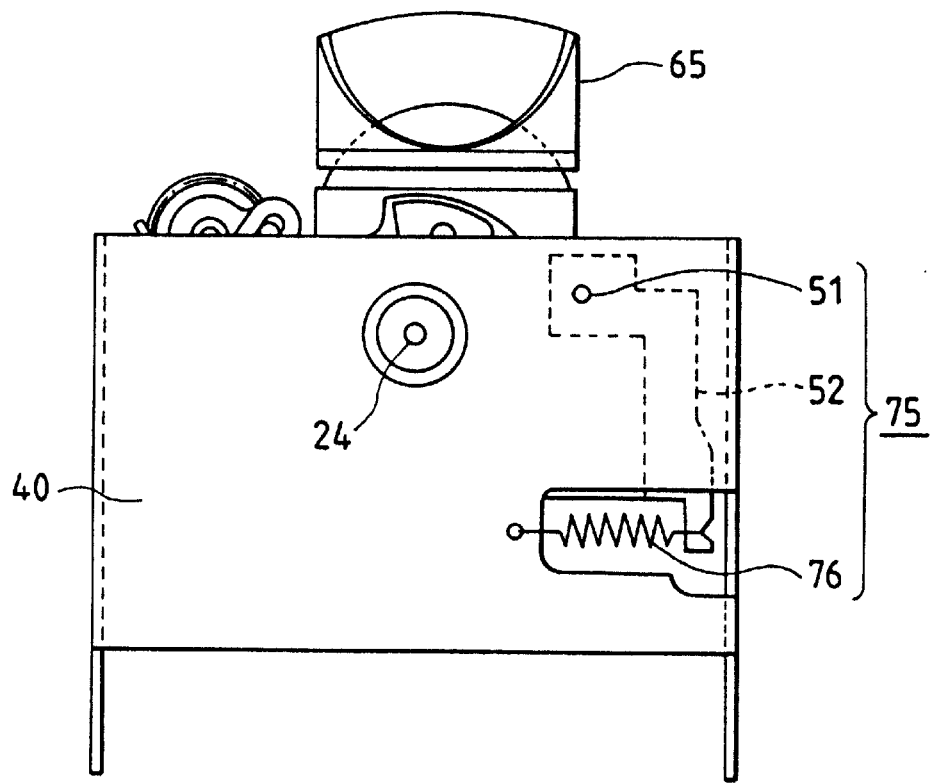
FIG. 8 is a view in the direction of the arrow A8 in FIG. 6.
Figure 9:
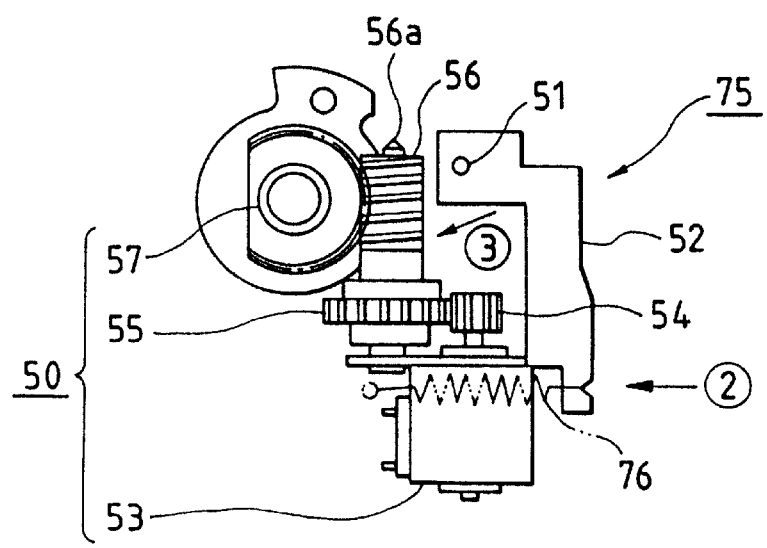
FIG. 9 is an elevation view of a second pressing mechanism in the optical transmitting and receiving apparatus in FIG. 8.

With reference to FIGS. 8 and 9, the second support member 40 is provided with a pressing mechanism 75 distant from the shaft 24. The pressing mechanism 75 urges the worm 56 into mesh with the wheel gear 57 which is fixed to the shaft 24. The pressing mechanism 75 includes the pin 51, the swing plate 52, and a spring 76. The swing plate 52 supports the motor 53, the small-diameter gear 54, the large-diameter gear 55, and the worm 56 which are the parts of the second rotary mechanism 50. The swing plate 52 can rotate relative to the second support member 40 in either a clockwise direction or a counterclockwise direction about the pin 51. The spring 76 is connected between the swing plate 52 and the second support member 40. The spring 76 urges the swing plate 52 relative to the second support member 40 in a clockwise direction ②, thereby pressing the worm 56 against the wheel gear 57 along an oblique direction ③. Accordingly. a backlash hardly occurs between the worm 56 and the wheel gear 57. The worm 56 is slidably mounted on a shaft 56a fixed to the swing plate 52. A compression spring (not shown) urges the worm 56 axially relative to the shaft 56a. Accordingly, a backlash hardly occurs between the worm 56 and the wheel gear 57 even when the direction of rotation of the worm 56 changes. Thus, it is possible to provide a good response of rotational control of the shaft 24 and a good reliability of the apparatus 1.

As shown in FIG. 10, the light transmitting and receiving unit 10 includes a body or a block 16. The light transmitting lens 12 and the light receiving lens 13 are attached to an upper portion of the block 16. The photosensitive element 14 is attached to a lower potion of the block 16 via a middle plate 17 forming a printed circuit board. The light emitting element 11 and a light-reception-side circuit 19 are attached to the lower portion of the block 16 via a bottom plate 18. The light transmitting lens 12 and the light receiving lens 13 are arranged side by side. The axis of the light transmitting lens 12 and the axis of the light receiving lens 13 are parallel to each other. Accordingly, the light transmitting lens 12 and the light receiving lens 13 face in equal directions. The top of the light transmitting lens 12 is lower than the top of the light receiving lens 13 by a predetermined height or a predetermined offset "h".

Figure 11:
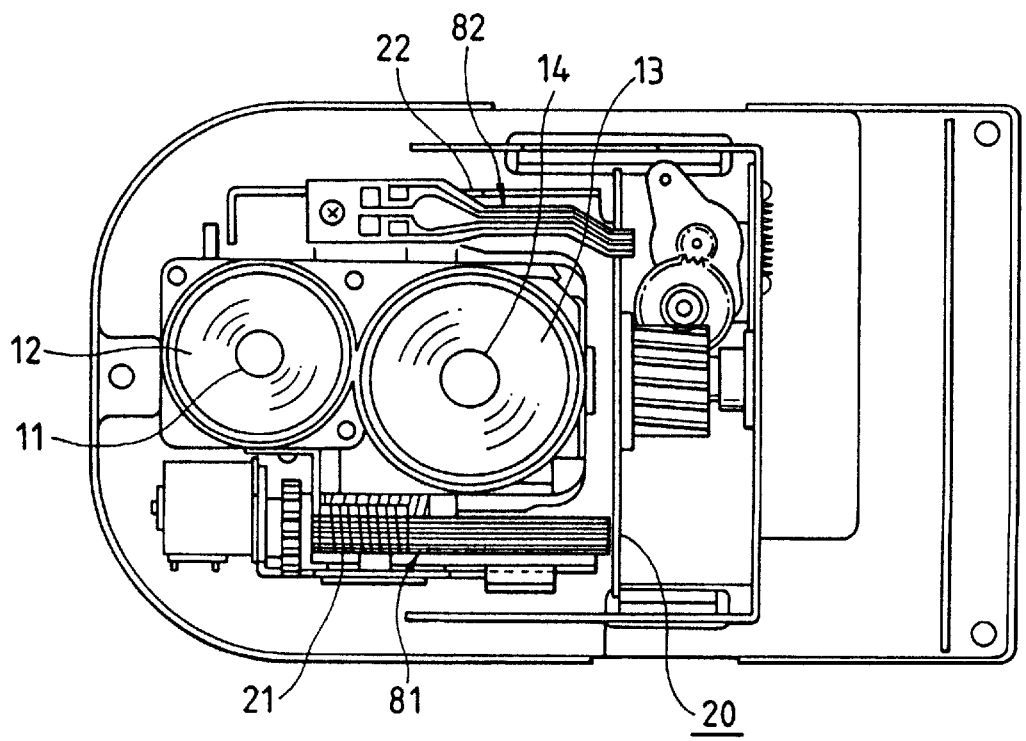
FIG. 11 is a top view of the optical transmitting and receiving apparatus in FIG. 5 to which flexible cables are added.

With reference to FIG. 11, a transmission-side flexible cable 81 having a flat shape extends along a lower surface of the left-hand arm 21. The transmission-side flexible cable 81 reaches the light emitting element 11. The transmission-side flexible cable 81 also extends along the surface of the wheel gear 35 from which the teeth are omitted. In other words, the transmission-side flexible cable 81 passes through a region formed by the omission of the arcuate portion from the wheel gear 35. The transmission-side flexible cable 81 may extend along a course bypassing the surface of the wheel gear 35 from which the teeth are omitted. A reception-side flexible cable 82 having a flat shape extends along an upper surface of the right-hand arm 22. The reception-side flexible cable 82 leads from the photosensitive element 14 or the light-reception-side circuit 19 (see FIG. 10). Accordingly, the transmission-side flexible cable 81 and the reception-side flexible cable 82 are separate from each other by a sufficient distance. The transmission-side flexible cable 81 and the reception-side flexible cable 82 include, for example, flexible printed circuits (FPC's).

Figure 12:
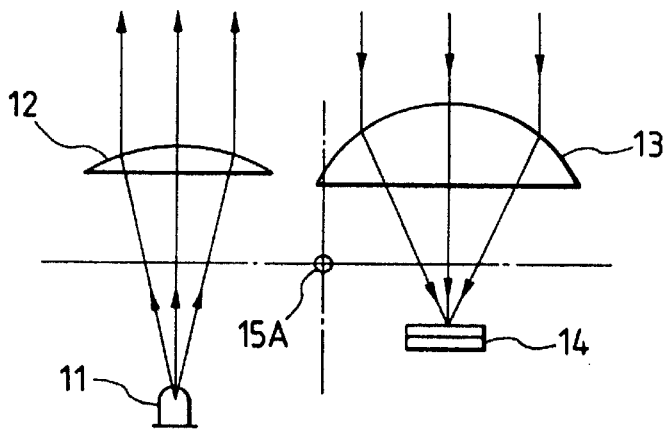
FIG. 12 is a sectional diagram of a light transmitting lens, a light receiving lens, a light emitting element, and a light receiving element in the optical transmitting and receiving apparatus in FIG. 5 which are in conditions where the light transmitting lens and the light receiving lens face directly upward.

Operation of the optical transmitting and receiving apparatus 1 will be explained hereinafter. The light transmitting and receiving unit 10 is rotated by the first rotary mechanism 30 about the axes of the shafts 15A and 15B. FIG. 12 shows conditions in which the light transmitting lens 12 and the light receiving lens 13 face directly upward. Under the conditions in FIG. 12, light outputted from the light emitting element 11 travels to the light transmitting lens 12. The light passes through the light transmitting lens 12, being converted thereby into a parallel light beam. The parallel light beam travels from the light emitting lens 12 in a directly upward direction as an outgoing light beam. Under the conditions in FIG. 12, incoming light which enters the light receiving lens 13 along a directly downward direction is concentrated thereby on the photosensitive element 14.

Figure 13:
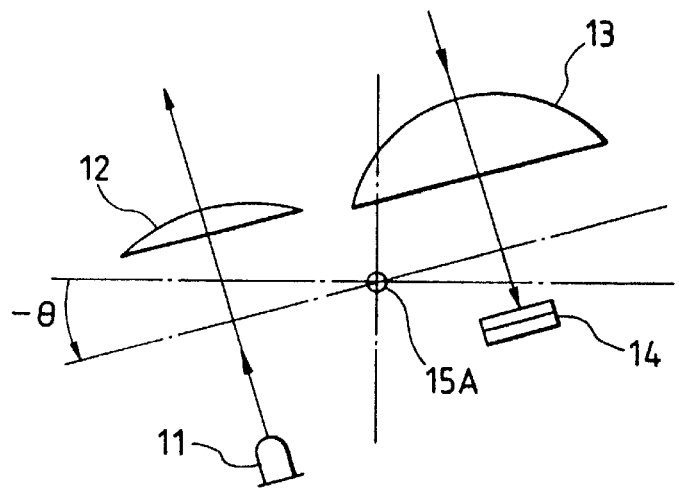
FIG. 13 is a sectional diagram of the light transmitting lens, the light receiving lens, the light emitting element, and the light receiving element in conditions which occur when they are rotated counterclockwise from the positions in FIG. 12 through a given angle.
Figure 14:
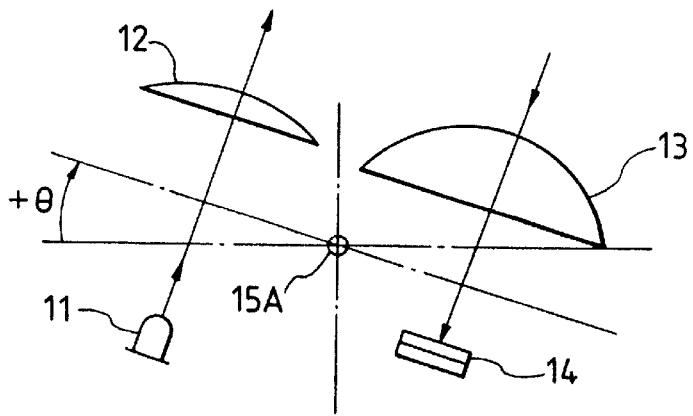
FIG. 14 is a sectional diagram of the light transmitting lens, the light receiving lens, the light emitting element, and the light receiving element in conditions which occur when they are rotated clockwise from the positions in FIG. 12 through a given angle.

FIG. 13 shows conditions which occur when the light transmitting and receiving unit 10 is rotated counterclockwise about the axes of the shafts 15A and 15B from the position in FIG. 12 by an angle "θ". FIG. 14 shows conditions which occur when the light transmitting and receiving unit 10 is rotated clockwise about the axes of the shafts 15A and 15B from the position in FIG. 12 by an angle "θ". The angle "θ" in each of FIGS. 13 and 14 can be arbitrarily varied by the first rotary mechanism 30 in response to an output signal of a controller (not shown).

Figure 15:
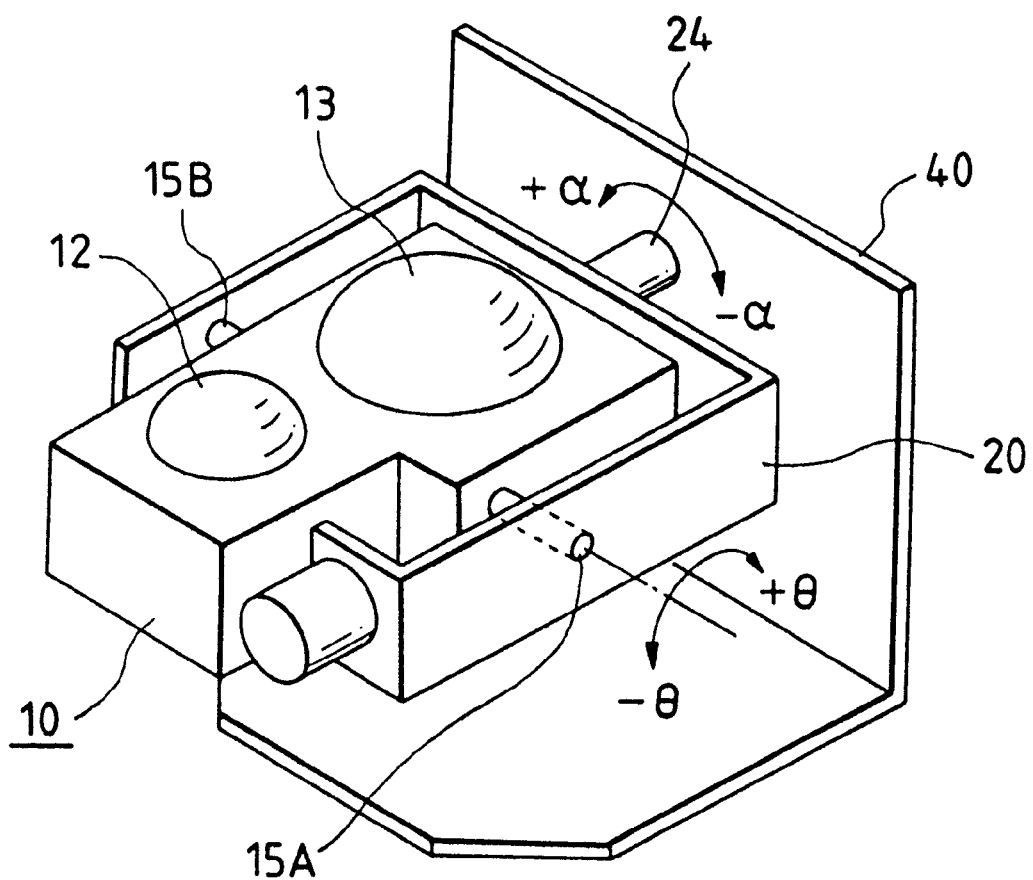
FIG. 15 is a perspective diagram of a portion of the optical transmitting and receiving apparatus in FIG. 5.

As shown in FIG. 15, the light transmitting and receiving unit 10 can be rotated about the axes of the shafts 15A and 15B in an angular range between +θ and −θ. This rotation of the light transmitting and receiving unit 10 is implemented by the first rotary mechanism 30. The light transmitting and receiving unit 10 can be rotated about the axis of the shaft 24 in an angular range between +α and −α. This rotation of the light transmitting and receiving unit 10 is implemented by the second rotary mechanism 50. Accordingly, the light transmitting and receiving unit 10 can face in any direction within at least a part of a spherical range.

Thus, the light transmitting and receiving unit 10 is enabled to accurately follow a moving communication opposite party.

Figure 17:
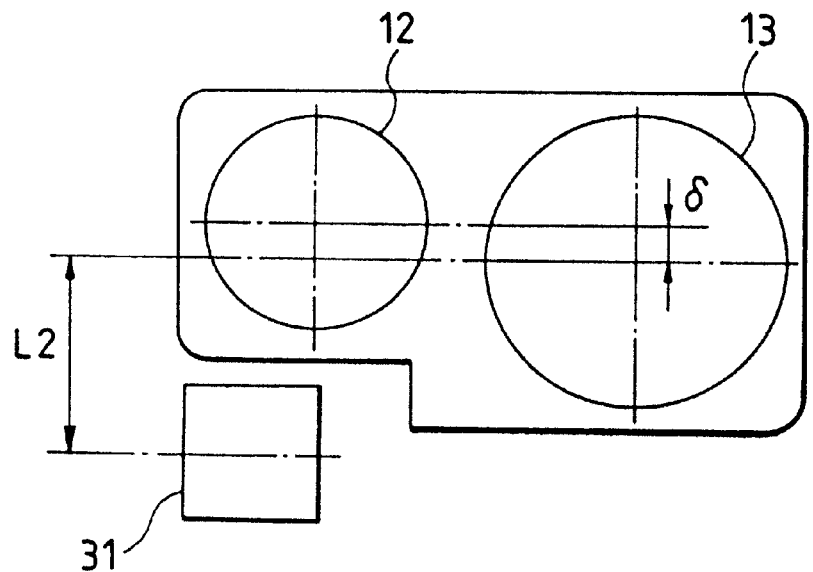
FIG. 17 is a diagrammatic top view of a light transmitting lens, a light receiving lens, and a motor in the optical transmitting and receiving apparatus in FIG. 5.

It is preferable that as shown in FIG. 17, the center of the light transmitting lens 12 is offset from the center of the light receiving lens 13 by a predetermined distance "67" along a widthwise direction of the light transmitting and receiving unit 10 (a widthwise direction of the apparatus 1). Since the light receiving lens 13 is greater in diameter than the light transmitting lens 12, the offset arrangement provides a large free space at one side of the light transmitting lens 12. The motor 31 is placed into the free space at the side of the light transmitting lens 12. The center of the light receiving lens 13 coincides with a point on the axis of the shaft 24 (see FIG. 5) as viewed from above.

Figure 16:
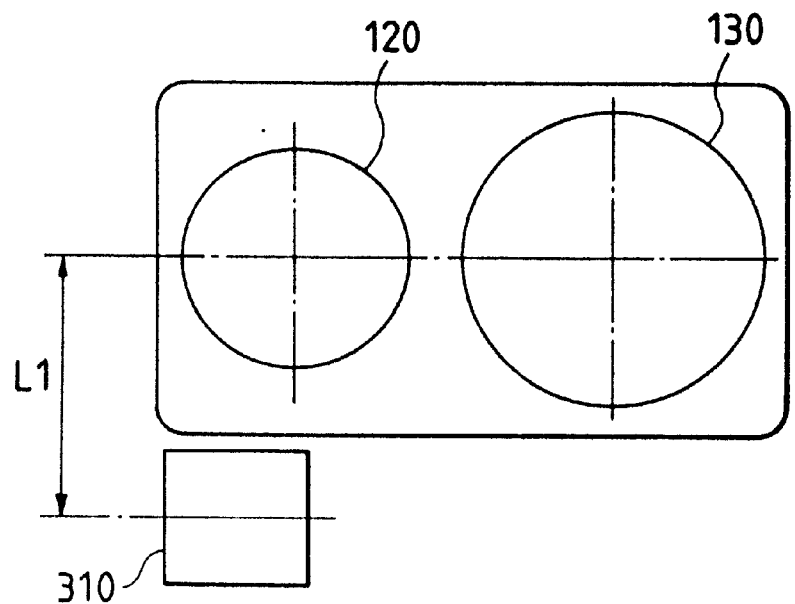
FIG. 16 is a diagrammatic top view of a light transmitting lens, a light receiving lens, and a motor.

The offset arrangement of FIG. 17 may be replaced by a non-offset arrangement in FIG. 16. In the non-offset arrangement of FIG. 16, the centers of a light emitting lens 120 and a light receiving lens 130 are on a common lengthwise line which separates from the axis of a motor 310 (corresponding to the motor 31) by a distance L1. A moment of inertia, that is, a rotational inertia ($GD^2$), related to the motor 310 has a factor of $Wm \cdot (L1)^2$ where Wm denotes the weight of the motor 310.

In the offset arrangement of FIG. 17, a lengthwise line which passes through the center of the light receiving lens 13 separates from the axis of the motor 31 by a distance L2 smaller than the distance L1. Accordingly, a moment of inertia (a rotational inertia) related to the motor 31 is smaller than that related to the motor 310 when the motors 31 and 310 are equal in weight. The smaller moment of inertia (the smaller rotational inertia) provides better response characteristics of the motor 31.

Figure 19:
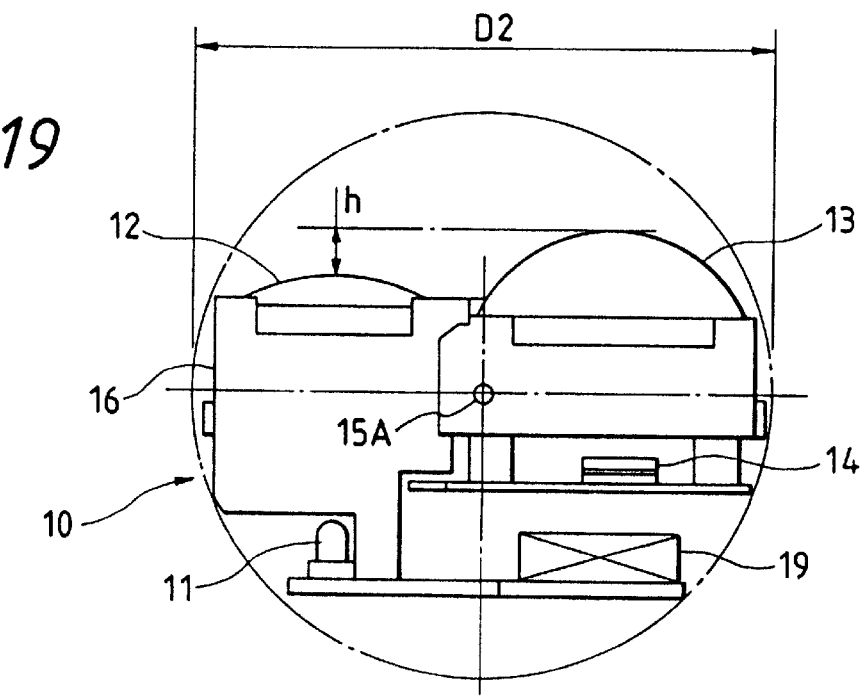
FIG. 19 is a sectional diagram of a light transmitting lens, a light receiving lens, a block, a light emitting element, and a photosensitive element in the optical transmitting and receiving apparatus in FIG. 5.

It is preferable that as shown in FIG. 19, the top of the light transmitting lens 12 is lower than the top of the light receiving lens 13 by a predetermined height or a predetermined offset "h".

Figure 18:
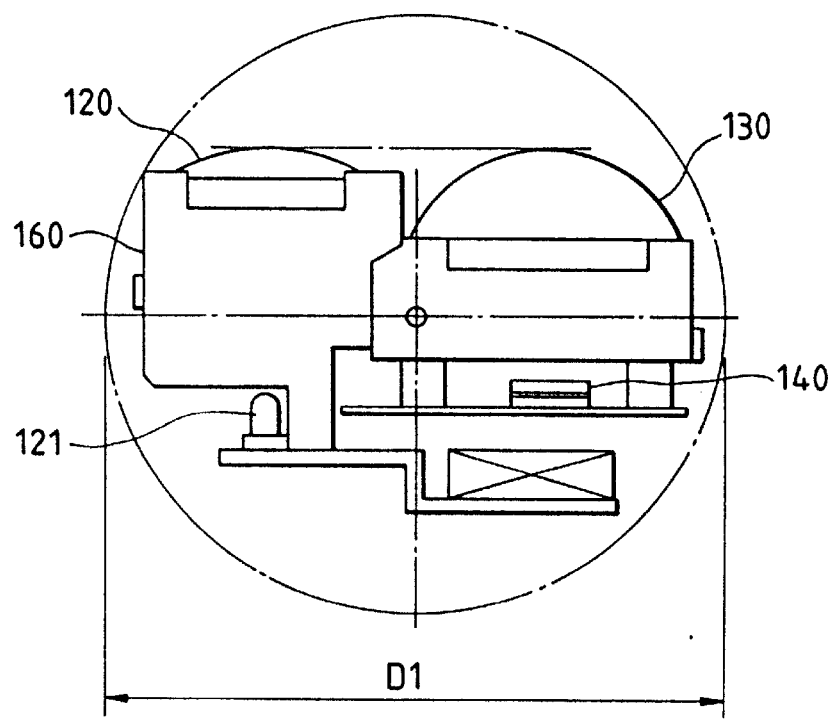
FIG. 18 is a sectional diagram of a light transmitting lens, a light receiving lens, a block, a light emitting element, and a photosensitive element.

The offset arrangement of FIG. 19 may be replaced by a non-offset arrangement in FIG. 18. In the non-offset arrangement of FIG. 18, the top of a light emitting lens 120 and the top of a light receiving lens 130 are equal in height position. In the non-offset arrangement of FIG. 18, a smallest virtual circle which surrounds a block 160 (corresponding to the block 16) and parts mounted thereon has a diameter D1. In the virtual circle, a large free space extends below a light emitting element 121 (corresponding to the light emitting element 11).

The offset arrangement of FIG. 19 uses the large free space below the light emitting element 121 (see FIG. 18) in providing the offset between the tops of the light emitting lens 12 and the light receiving lens 13. In the offset arrangement of FIG. 19, a smallest virtual circle which surrounds the block 16 and parts mounted thereon has a diameter D2 smaller than the diameter D1. Thus, the offset arrangement of FIG. 19 provides a compact structure of the light emitting and receiving unit 10 and a reduced load on the motor 31.

Figure 20:
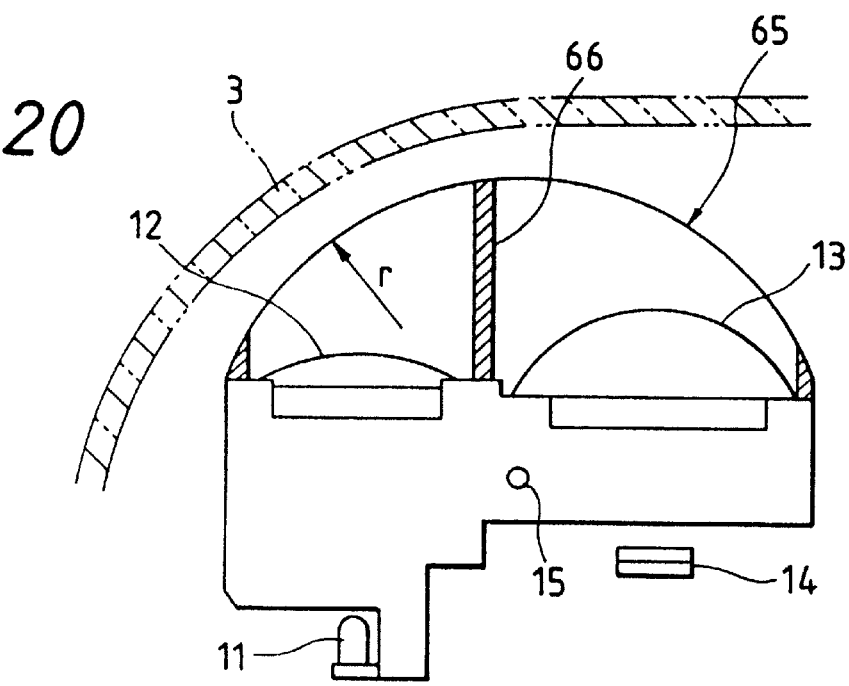
FIG. 20 is a sectional view of a cover, a visor, and a light emitting and receiving unit in the optical transmitting and receiving apparatus in FIG. 3.

As shown in FIG. 20, the visor 65 extends inward of the cover 3. The visor 65 includes a first cylinder which surrounds a light propagation path extending in front of the light transmitting lens 12. Also, the visor 65 includes a second cylinder which surrounds a light propagation path extending in front of the light receiving lens 13. Furthermore, the visor 65 includes a tall partition wall 66 which forms a common portion of the first and second cylinders. Thus, the partition wall 66 connects the first and second cylinders. The partition wall 66 separates the two light propagation paths from each other. The visor 65 prevents outgoing light, which passes through the light transmitting lens 12, from entering the light receiving lens 13. The first cylinder, the second cylinder, and the partition wall 66 of the visor 65 are integral with each other.

It should be noted that the first and second cylinders in the visor 65 may be separate members respectively.

Figure 21:
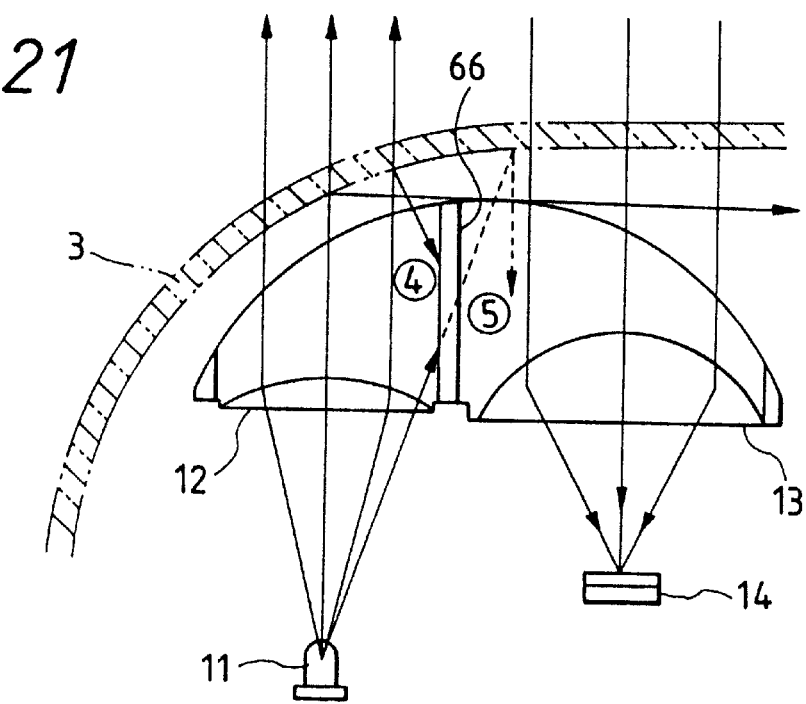
FIG. 21 is a sectional view, corresponding to FIG. 20, of the cover, the visor, and the light emitting and receiving unit, and paths of light.

With reference to FIG. 21, in some cases, a portion of outgoing light which has passed through the light transmitting lens 12 is reflected at the inner surfaces of the cover 3 toward the light receiving lens 13 as denoted by the arrow ④. The partition wall 66 of the visor 65 blocks such unwanted light ④. In the absence of the partition wall 66, a portion of outgoing light which had passed through an edge of the light transmitting lens 12 might be reflected at the inner surfaces of the cover 3 toward the light receiving lens 13 as denoted by the arrow ⑤. The partition wall 66 of the visor 65 blocks such unwanted light ⑤. In addition, the visor 65 periodically reflects disturbance-causing light, thereby attenuating the disturbance-causing light.

As previously explained, the visor 65 prevents outgoing light, which passes through the light transmitting lens 12, from entering the light receiving lens 13. Therefore, the visor 65 prevents wrong operation of the apparatus 1 which would be caused by such unwanted entrance of outgoing light into the light receiving lens 13. The visor 65 has two open ends corresponding to the light transmitting lens 12 and the light receiving lens 13 respectively. It is preferable that the curvature radius "r" (in FIG. 20) of the transmission-side open end of the visor 65 agrees with that of the inner surfaces of the cover 3.

Figure 24:
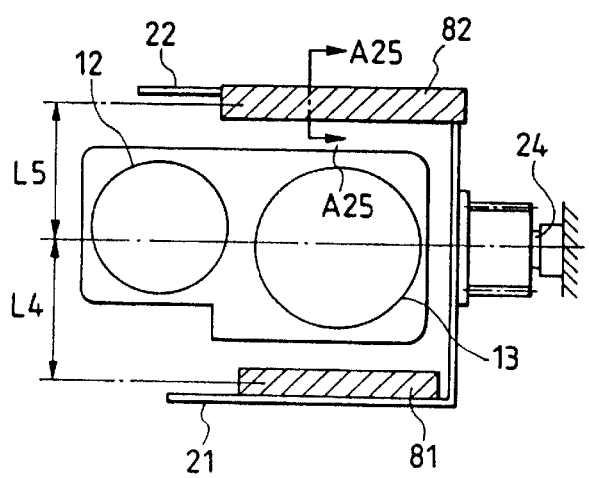
FIG. 24 is a diagram of a light transmitting and receiving unit, arms, a shaft, a transmission-side flexible cable, and a reception-side flexible cable in the optical transmitting and receiving apparatus of FIG. 11.

As shown in FIG. 24, the transmission-side flexible cable 81 extends along the left-hand arm 21 while the reception-side flexible cable 82 extends along the right-hand arm 22. The transmission-side flexible cable 81 is distant from the axis of the shaft 24 by a value L4. The reception-side flexible cable 82 is distant from the axis of the shaft 24 by a value L5. Adjustment of the distances L4 and L5 provides a balanced rotation moment related to the rotation of the combination of the parts about the axis of the shaft 24.

Figure 25:
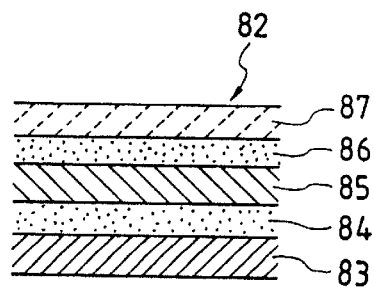
FIG. 25 is a sectional view of the reception-side flexible cable which is taken along the line A25—A25 in FIG. 24.

As shown in FIG. 25, the reception-side flexible cable 82 includes a non-shield-type substrate having a base film 83. An adhesive layer 84, a pattern-side conductive layer 85, an adhesive layer 86, and a cover film 87 are successively laminated on the base film 83. Such a non-shield-type substrate is light in weight, thin, inexpensive, and remarkably flexible. The transmission-side flexible cable 81 is similar in structure to the reception-side flexible cable 82. Since the transmission-side flexible cable 81 and the reception-side flexible cable 82 are distant from each other, it is possible to prevent crosstalk between the cables 81 and 82.

Figure 22:
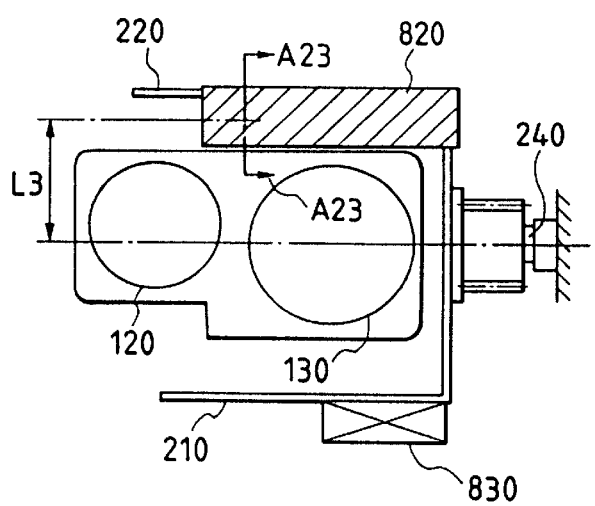
FIG. 22 is a diagram of a light transmitting and receiving unit, arms, a shaft, and a transmission-reception flexible cable.

The cable arrangement of FIG. 24 may be replaced by a cable arrangement of FIG. 22 which includes a transmission-reception flexible cable 820 instead of the transmission-side flexible cable 81 and the reception-side flexible cable 82. In the cable arrangement of FIG. 22, the transmission-reception flexible cable 820 extends along a right-hand arm 220 corresponding to the right-hand arm 22.

Figure 23:
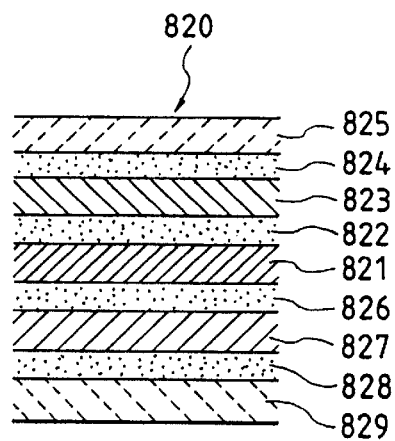
FIG. 23 is a sectional view of the transmission-reception flexible cable which is taken along the line A23—A23 in FIG. 22.

As shown in FIG. 23, the transmission-reception flexible cable 820 includes a shield-type substrate having a base film 821. An adhesive layer 822, a pattern-side conductive layer 823, an adhesive layer 824, and a cover film 825 are successively laminated on an upper surface of the base film 821. An adhesive layer 826, a shield-pattern-side conductive layer 827, an adhesive layer 828, and a cover film 829 are successively laminated on a lower surface of the base film 821.

In the cable arrangement of FIG. 22, a weight 830 may be attached to a left-hand arm 210 (corresponding to the left-hand arm 21) to provide a good balance with respect to the rotation of a combination of parts about the axis of a shaft 240 (corresponding to the shaft 24).

The optical transmitting and receiving apparatus 1 has the following advantages. The optical axis of the apparatus 1 can be varied at a high speed. The apparatus 1 can accurately face an apparatus of a communication opposite party. The apparatus 1 can quickly follow movement of the apparatus of the communication opposite party. Since the transmission-side flexible cable 81 and the reception-side flexible cable 82 are located at a left-hand side and a right-hand side of the apparatus 1 respectively, it is possible to easily provide a stable apparatus weight balance. In addition, it is possible to prevent crosstalk between a transmission signal and reception signal on the cables 81 and 82. Since the bearings 26A, 26B, and 41 are composed of electrically-conductive members, static electricity can be prevented from building up in the apparatus 1. Since the light transmission side and the light reception side of the apparatus 1 are optically isolated by the visor 65, outgoing light emitted from the light transmission side can be prevented from entering the light receiving side. In addition, the visor 65 periodically reflects disturbance-causing light, thereby attenuating the disturbance-causing light.

What is claimed is:

1. An optical transmitting and receiving apparatus comprising:

a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, wherein the light receiving lens concentrates incoming light on the photosensitive element, and wherein the light transmitting lens and the light receiving lens are arranged side by side and face in equal directions;

a rotary mechanism for rotating the light transmitting and receiving unit;

a dome-shaped cover covering the light transmitting and receiving unit, and conducting light of a predetermined wavelength while blocking light of a wavelength different from the predetermined wavelength, the cover having a curved shape separate from a trajectory defined by the light transmitting and receiving unit during rotation thereof; and a cylindrical visor connected to the light transmitting lens and having an end close to an inner surface of the cover, wherein the end of the visor has a curved shape similar to the curved shape of the cover.

2. An optical transmitting and receiving apparatus as recited in claim 1, wherein the end of the visor and the inner surface of the cover are substantially equal in radius of curvature.

3. An optical transmitting and receiving apparatus as recited in claim 1, further comprising a cylindrical visor connected to the light receiving lens, wherein the visor connected to the light transmitting lens is integral with the visor connected to the light receiving lens.

4. An optical transmitting and receiving apparatus comprising:

a light transmitting and receiving unit including 1) a light emitting element, 2) a light transmitting lens, 3) a light receiving lens, and 4) a photosensitive element, wherein the light emitting element outputs light, and the light outputted from the light emitting element passes through the light transmitting lens before leaving the light transmitting and receiving unit as outgoing light, wherein the light receiving lens concentrates incoming light on the photosensitive element, and wherein the light transmitting lens and the light receiving lens are arranged side by side and face in equal directions;

a rotary mechanism for rotating the light transmitting and receiving unit;

a dome-shaped cover covering the light transmitting and receiving unit, and conducting light of a predetermined wavelength while blocking light of a wavelength different from the predetermined wavelength, the cover having a curved shape; and a cylindrical visor connected to the light transmitting lens and having an end close to an inner surface of the cover, wherein the end of the visor has a curved shape similar to the curved shape of the cover.

5. An optical transmitting and receiving apparatus as recited in claim 4, wherein the end of the visor and the inner surface of the cover are substantially equal in radius of curvature.

6. An optical transmitting and receiving apparatus as recited in claim 4, further comprising a cylindrical visor connected to the light receiving lens, wherein the visor connected to the light transmitting lens is integral with the visor connected to the light receiving lens.

* * * * *